United States Patent [19]

Monson

[11] Patent Number: 5,582,211
[45] Date of Patent: Dec. 10, 1996

[54] PURGING BLIND

[76] Inventor: Jim W. Monson, Box 145, Burstall, Saskatchewan, Canada, S0N 0H0

[21] Appl. No.: 493,791

[22] Filed: Jun. 22, 1995

[51] Int. Cl.$^6$ ..................................................... F16L 55/10
[52] U.S. Cl. ............................. 138/94.3; 138/94; 138/42
[58] Field of Search .............................. 138/94, 94.3, 40, 138/45, 44, 46, 89, 42, 43; 251/193, 326

[56] References Cited

U.S. PATENT DOCUMENTS

| | | | |
|---|---|---|---|
| 2,462,731 | 2/1949 | Duggan | 138/94.3 X |
| 2,614,423 | 10/1952 | Carbone | 138/44 X |
| 2,709,455 | 5/1955 | Greenwood | 138/94.3 |
| 4,343,332 | 8/1982 | Williams, 3rd et al. | 138/94.3 |
| 4,712,585 | 12/1987 | Evans | 138/94.3 X |
| 5,201,344 | 4/1993 | Lacouture . | |

*Primary Examiner*—Patrick Brinson
*Attorney, Agent, or Firm*—Biebel & French

[57] ABSTRACT

The present invention relates to a device which simplifies the isolation and purging procedures in a pipeline when the vessel requires entry for hot work. The invention provides a single component purging blind with a body and purging channels which provide for simple and effective installation and removal from a pipeline with improved safety to personnel.

12 Claims, 4 Drawing Sheets

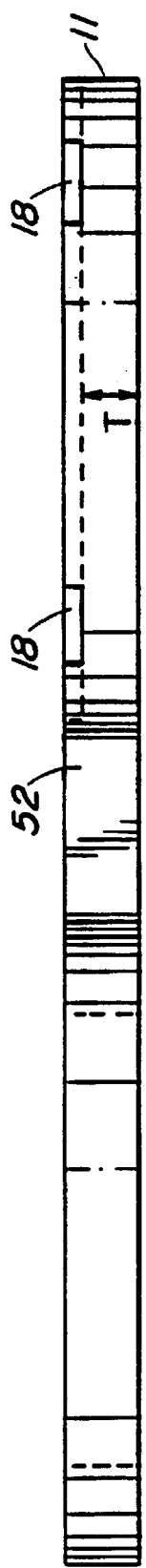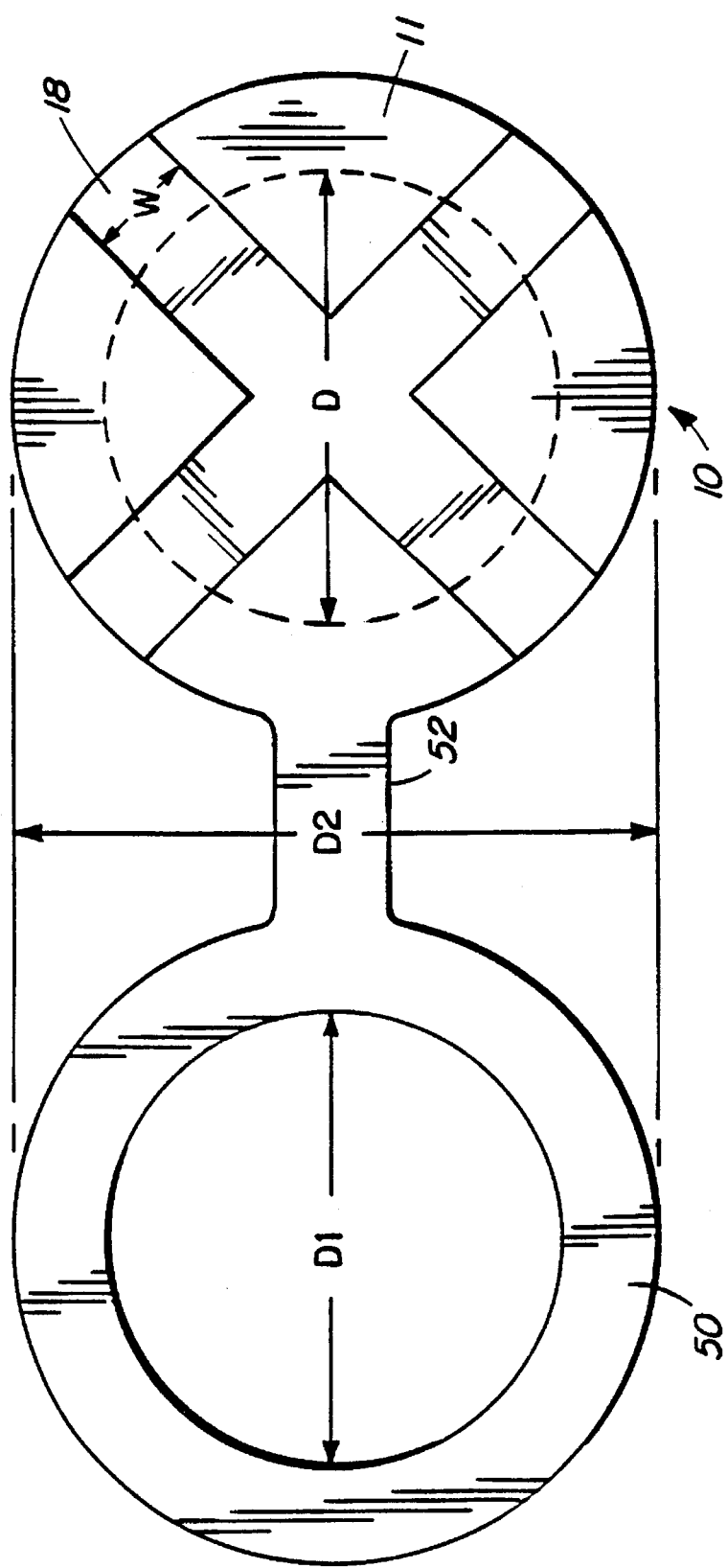

5,582,211

PURGING BLIND

FIELD OF THE INVENTION

The present invention relates to a device which simplifies the isolation and purging procedures in a pipeline when the vessel requires entry for hot work. The invention provides a single component purging blind with a body and purging channels which provide for simple and effective installation and removal from a pipeline with improved safety to personnel.

BACKGROUND OF THE INVENTION

In the petrochemical industry where systems of pipes are used to carry toxic and/or explosive gases or liquids, both scheduled and unscheduled work is periodically required on the pipe system. This work is usually required for maintenance or insurance purposes or to comply with provincial, state or federal laws. When modifications to the piping system, routine maintenance and/or leak repairs are to be performed, this work may require vessel entry for hot work such as torch cutting or welding.

In order to undertake hot work, it is necessary that a particular section of pipe be isolated from adjacent or connecting equipment and completely purged of any potentially explosive material within the pipeline. The isolation and purging procedures are very exacting and require experienced personnel to conduct the work in order to eliminate the risk of explosion and/or damage to the equipment.

In the past, practice has been to isolate and seal a particular section of pipe from the adjacent pipes in the system. Past practice has been to use a steel plate or blind and a number of spacers sandwiched between the steel plate and an adjacent flange which thereby form a series of openings to permit a purging gas to be flushed through the isolated section of pipe. In a typical pipe connection, the connecting pipe sections are bolted together through flanges on each pipe end with a gasket sandwiched between abutting end surfaces. In isolating one section of pipe from the other in order for work to be performed one section of pipe, the flange bolts are loosened and the pipe sections are spread apart using a flange spreading tool. A number of bolts are removed to provide sufficient space to insert a steel plate between the flanges and inside the bolts of adjacent pipe sections. Any gasket between the flanges would normally be retained on the side of the pipe section which is not being worked upon. A number of metal spacers would be placed on the work side of the plate, between the plate and flange thereby creating spaces to allow gases/vapours to escape. The flange bolts are reinserted and all are tightened to create a tight seal and hold all components in place. A similar procedure at the opposite end of the pipe section would create a second space to enable a purging gas to be flushed through the pipe section.

While this procedure can effectively be used to create a safe environment for hot work, a number of problems exist which can lead to unsafe practices and/or damage to equipment. In particular, the use of separate metal spacers requires the handling and positioning of several components, each of which must be accurately placed before tightening of the flange bolts at the time of installing the blind. Each component must also be carefully removed when the blind is removed. In this situation, the opportunity exists, both during placement and removal, for any number of spacers to drop into the pipe necessitating their removal. Removal of dropped spacers is difficult and time-consuming. In situations where it has not been noticed that a spacer has dropped into the pipe, the loose spacer may be trapped within the pipe causing damage elsewhere in the system when flow is resumed in the system. Furthermore, if spacers are of marginally different thickness, the spacer may not be tightly sandwiched between the flanges when the flange bolts are tightened, leading to a situation where the spacer may drop within the pipe or be blown out by the force of the purging medium. Furthermore, in the past, the materials used as spacers have been highly varied and often unsuitable and have included materials such as welding rods, washers, shim metal and even wood. The use of spacers may also contribute to flange and/or gasket damage which then results in a leaking joint when the system is put back in service. Expensive repairs or replacements may be required to correct leaks. Furthermore, in the past, where leaking joints have resulted from a purging operation using spacers, flange bolts are often over-torqued when re-tightened following the purging operation and which may thereafter contribute to a later failure of the bolt.

Accordingly, there has been a need for a purging blind that eliminates the need for spacers by providing a single component design for a purging blind.

Furthermore, when a blind is installed between two pipe sections, it is important that it is axially aligned between the flanges to ensure sufficient overlap between the blind and the inner flange surface. An improperly aligned blind may be subject to loss of seal and result in an explosion hazard. Thus, there has been a need for a purging blind that is self-locating between the pipe-sections to ensure correct axial alignment between the blind and flanges.

Furthermore, there has been a need for a purging blind that can be used in a variety of different sized pipe sections. In that pipes used in the industry generally comply with American National Standards Institute (ANSI) or American Petroleum Institute (API) Specification Tables, there has been a need for a purging blind design that may be used in pipes of different sizes in order to reduce the number of purging blinds which need to be stocked where the design ensures axial alignment of the blind.

Furthermore, there has been a need for a purging blind that is reversible and can be installed for left to right purging or right to left purging as required.

There has also been a need for a device designed for ease of installation and removal, having a one-piece construction with a handle and that is transportable to remote locations including off-shore rigs, if necessary.

Furthermore, in order to simplify the purging process and reduce costs associated with purging, there has been a need for a purging blind that provides a series of blind sizes with channels which enable a consistent purging volume to be expelled where the channel widths varying with blind diameter. Specifically, there has been a need for a device that for a given pressure of purge gas, the flow of that purge gas through the channels of the blind will remain constant through all pipe diameters for more consistent purging which is critical to the safety of personnel and equipment.

Furthermore, there has been a need for a purging blind where the centre-line of one venting channel is offset with respect to the centre line of a handle in order to ensure that the venting blind allows purging gases to exhaust through the channels which are not aligned with any of the flange bolts so as to avoid any possible restriction to the exhaust of the purge gas.

As indicated above, past practice in the industry has been to cut the correct diameter of the blind from carbon steel plate which is then inserted between flanges. One side of the plate is gasketed and spacers are inserted in the other side of the blind in order to create channels for effect purging.

A review of the prior art reveals that the problems discussed above have not been addressed in past devices. For example, U.S. Pat. No. 4,452,278 discloses a spectacle line blind with a vent that enables two sections of pipe to be isolated from another and U.S. Pat. 2,726,683 discloses a spectacle blind which also enables two sections of pipe to be isolated from one another. These patents do not, however, disclose a venting blind for use with flanged pipe sections that could be implemented without structural changes to the piping system.

SUMMARY OF THE INVENTION

In accordance with the invention, a purging blind for placement between first and second adjacent pipe sections each having respective flanges and an interior and exterior is provided, comprising:

a body adapted for placement between the flanges without requiring modification to the flanges, the body having a first side for sealing engagement with the first section and a second side for engagement with the second section, the second side having at least one purging channel for allowing the passage of a purging medium between the interior and exterior of the second pipe section.

In accordance with alternate and more specific embodiments of the invention, a purging blind is provided having additional features. In one embodiment, the first and second adjacent pipe sections have circular cross-sections and are connected by flange bolts through a flange bolt circle and the body has a diameter sized to fit within the flange bolt circle. Furthermore, the invention provides a purging blind with a body having an external diameter corresponding to the internal diameter of a bolt circle on the flange.

In a further embodiment, the at least one purging channel has a uniform depth defining a solid thickness in the body, the solid thickness in accordance with American National Standards Institute (ANSI) B 31.1 Table 1.

In a still further embodiment, the body has a diameter sized to fit coincident or radial to the flange bolt circle and the body is further provided with bolt channels between the first and second sides of the body allowing the flange bolts to be inserted through the bolt channels and adjacent flange bolt circles.

In a still further embodiment, the body further includes a handle to facilitate placement and removal of the purging blind between the first and second pipe sections and/or a lug extending radially to the flange bolt circle, the lug having a lug bolt channel to allow the flange bolts to be inserted through the lug bolt channel and adjacent flange bolt circles.

In a preferred embodiment, the body has two purging channels each intersecting with the centre of the body, the purging channels offset with respect to a bolt hole of the flange bolt circle and the offset is 30° with respect to the handle or lug.

In another preferred embodiment, the purging channel width is directly proportional to the diameter of the body to provide a constant purge pressure between purging blinds of different diameters and the body is constructed of steel.

In a still further preferred embodiment, the body has a diameter corresponding to the internal diameter of a bolt circle on ANSI #150 flanges, the blind further comprising a lug and handle on the body positioned diametrically opposite to one another, the handle and lug having respective bolt channels adapted for placement against an ANSI #300 flange bolt circle.

In another embodiment, the purging blind further comprises a spectacle distance piece on the body for use between the flanges of said first and second pipe sections during normal assembly of the pipe sections.

BRIEF DESCRIPTION OF THE DRAWINGS

These and other features of the invention will be more apparent from the following description in which reference is made to the appended drawings wherein:

FIG. 4a is a plan view of an alternate embodiment of the invention;

FIG. 4b is a side view of an alternate embodiment of the invention.

DETAILED DESCRIPTION OF THE INVENTION

Figure 1A:
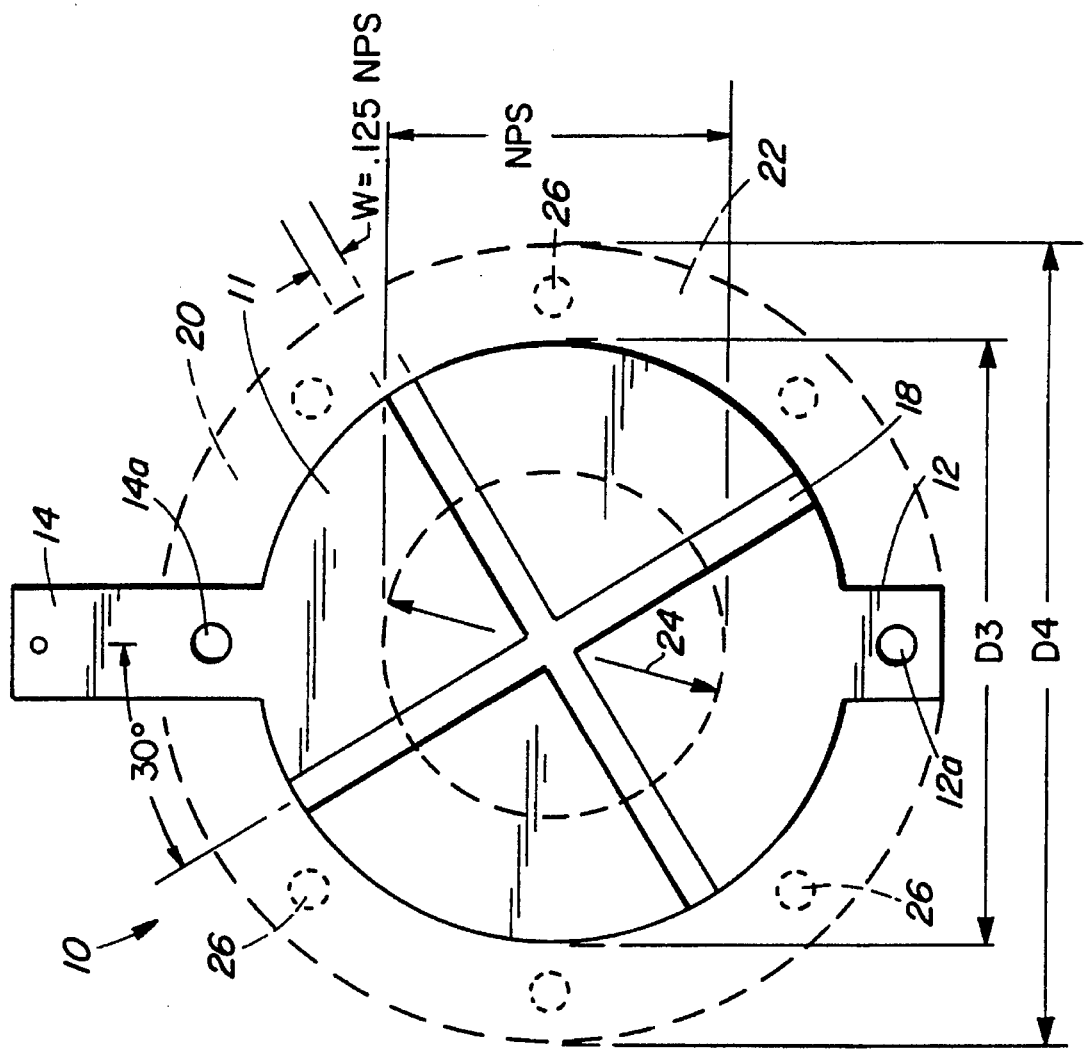
FIG. 1A is a plan view of a purging blind in accordance with the invention shown mounted on the end of a pipe section in a first configuration.
Figure 1B:
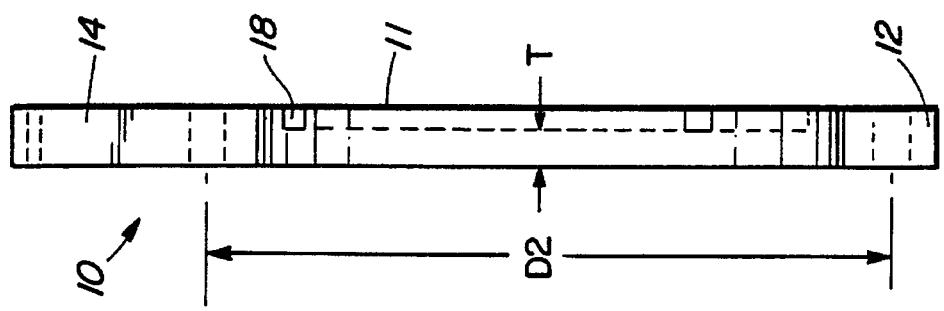
FIG. 1B is an end view of a purging blind in accordance with the invention.
Figure 2:
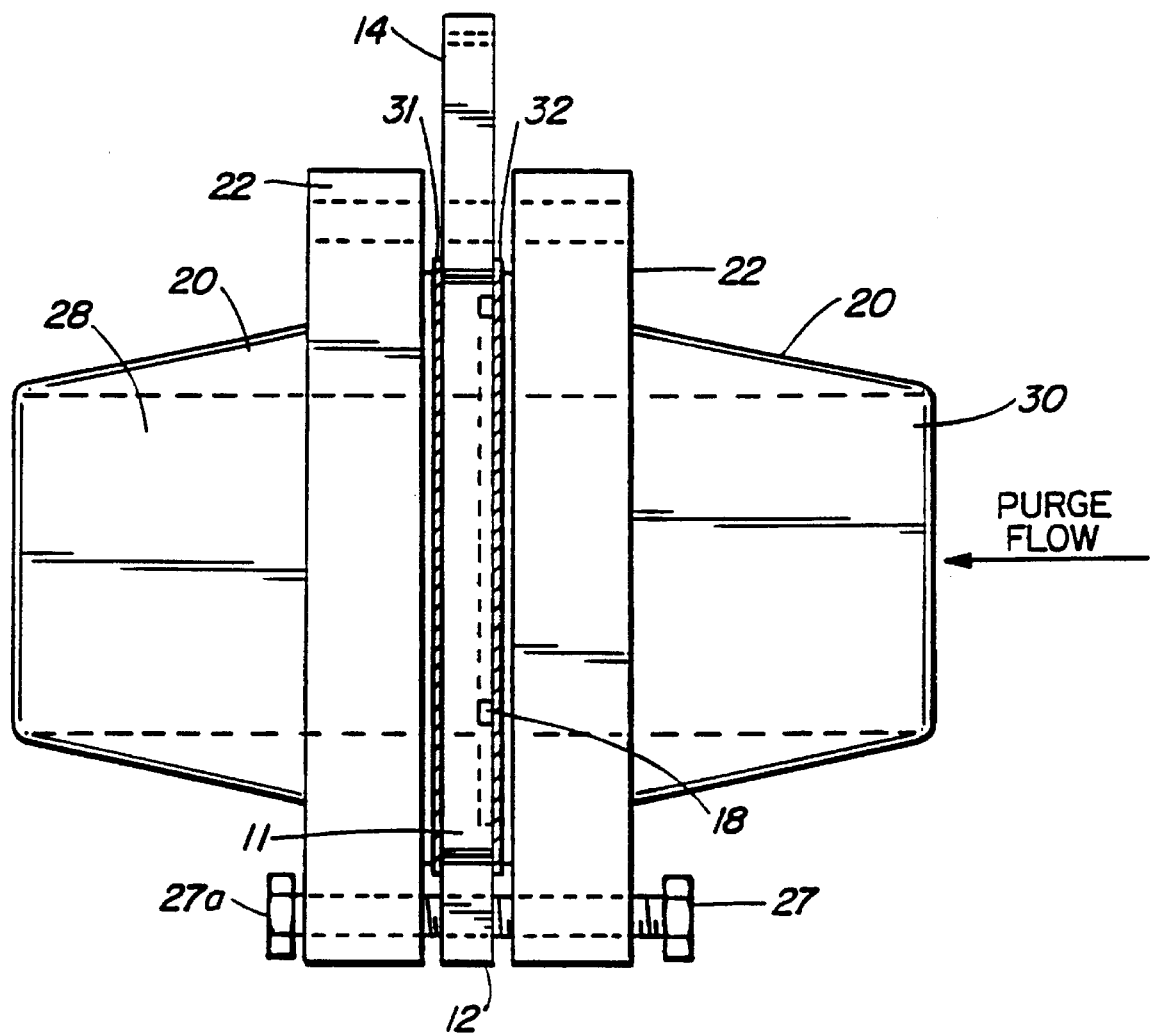
FIG. 2 is a side view of a purging blind in accordance with the invention installed between two pipe sections.
Figure 3:
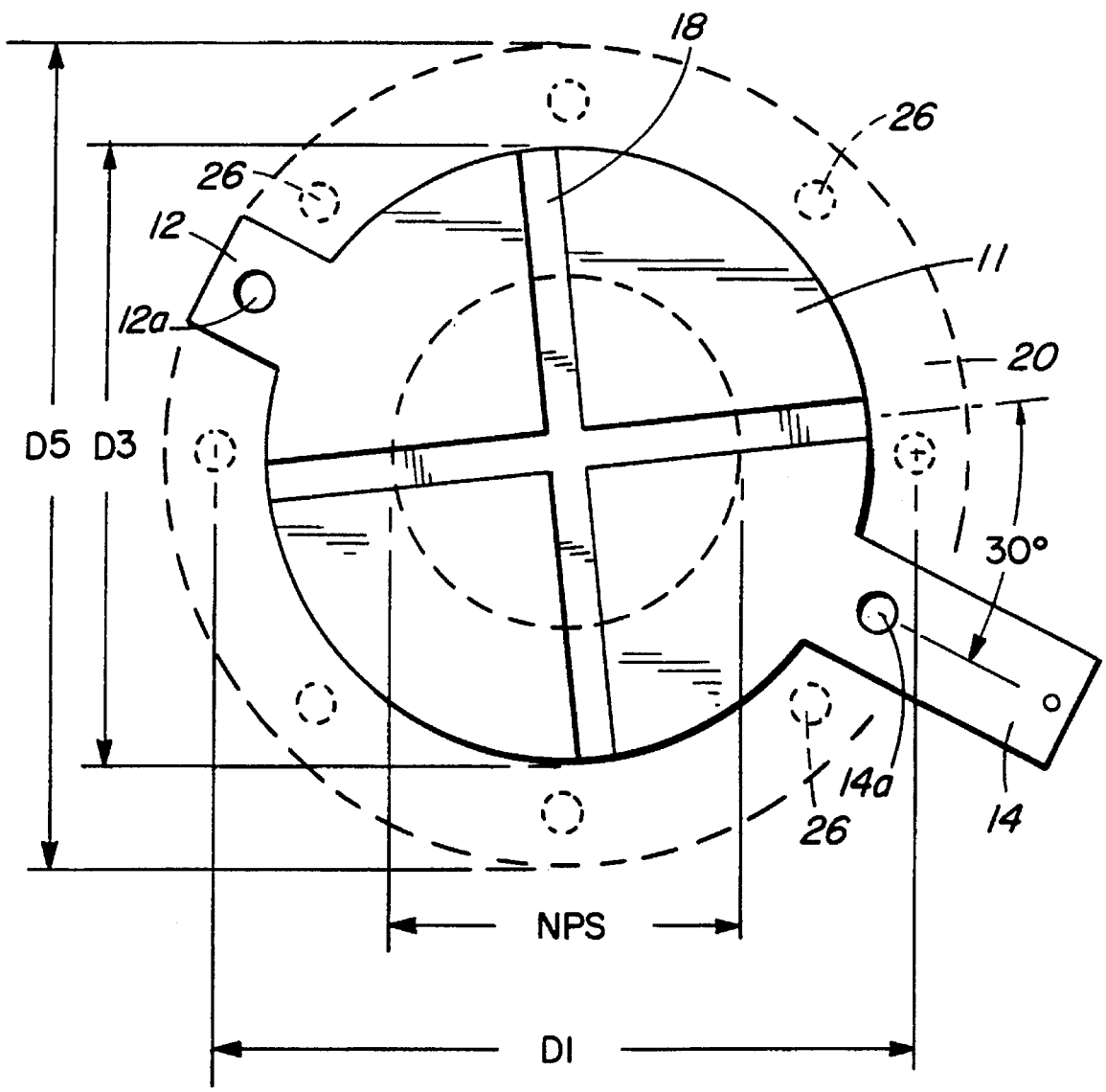
FIG. 3 is a plan view of a purging blind in accordance with the invention shown mounted on the end of a pipe section in an alternate configuration.

In accordance with the invention and with reference to the attached FIGS. 1–3, a purging blind 10 with body 11, lug 12, handle 14, and venting channels 18 is shown. FIG. 1A shows a side view of a purging blind 10, FIG. 1B shows an end view of a purging blind 10 mounted on the end of a typical pipe section 20, FIG. 2 shows a purging blind 10 mounted between two adjacent pipe sections and FIG. 3 shows an end view a purging blind mounted on the end of typical pipe section in an alternate mounting position.

As can be seen from the figures, a typical pipeline junction has two adjacent pipe sections 20, each with abutting flanges 22, an internal diameter 24, and bolt holes 26 defining a bolt hole circle. With reference to FIG. 2, a nut 27 and bolt 27a are shown for connecting and tightening the adjacent pipe sections 20 together.

In general, the purging blind 10 is sized to provide an effective seal between the two adjacent pipe sections, defined as a sealed side 28 and venting side 30 of a pipe section 20. In providing the seal, the body 11 of the purging blind 10 sufficiently overlaps with the flange 22 to provide a seal against the sealed side 28. In a typical pipeline installation, gaskets may be present between the flanges 22 to improve sealing and minimize damage to the inner flange surfaces. Accordingly, an existing pipeline gasket 31 along with a second gasket 32 may be used on both the sealed 28 and venting sides 30 of the purging blind when the purging blind is installed between adjacent pipe sections 20.

With reference to FIG. 1B and 3, a purging blind 10 is shown fit to typical pipe sections 20 in different configurations which demonstrates the flexibility and usefulness of the purging blind. For example, the most common classes of pipe sections are ANSI (American National Standards Institute) Class 150#, ANSI Class 300#, ANSI Class 400# and ANSI Class 600# where the higher the rating, the heavier the duty the flange is designed to perform. For larger diameters and special applications API (American Petroleum Institute)

flanges are fairly common. In both cases, flanges conforming to these standards have distinct bolt circle diameters and bolt hole diameters readily available from standard ANSI and API tables. Accordingly, based on these tables, a purging blind can easily be made to suit a particular pipe section.

Furthermore, in order to incorporate maximum flexibility into the use of the purging blind 10 into pipe sections of distinct standards, a purging blind can be designed on the basis of the similarities between pipe sections of related classes. For example, in the case of ANSI Class flanges, for any given diameter, the flange raised face diameter remains constant for ratings ANSI Class 150#, ANSI Class 300#, ANSI Class 400#, and ANSI Class 600#. The bolt circle diameter however, is greater for ANSI Class 300#, ANSI Class 400#, and ANSI Class 600# than it is for ANSI Class 150#. Accordingly, a purging blind 10 having a diameter that fits comfortably but snugly inside the flange bolts between a pair of ANSI Class 150# flanges will also fit between flanges of ANSI Class 300#, ANSI Class 400#, and ANSI Class 600# ratings with room to spare diametrically inside the flange bolts. The difference in bolt circle diameter between ANSI Class 150# flanges and the bolt circle diameter of the higher rated flanges increases as nominal pipe size (NPS) increases.

The difference at ½ NPS is ¼" whereas at 42 NPS the difference is 3¼" for ANSI Class 300# and ANSI Class 400# flanges and 4¼" for ANSI Class 600# flanges.

On the basis of the specific dimensions of a particular pipe size and class, purging blinds 10 can be made for any type of flange by simply referring to the pipe fitters handbook tables or API tables for dimensions of flanges. However, in a preferred embodiment of the invention, a purging blind interchangeable between different classes can be made. For example, ANSI Class 150# and ANSI Class 300# flanges are commonly used pipe sizes in the industry.

In accordance with this preferred embodiment, a lug 12 is included diametrically opposite to the handle 14 of the device. Two holes 12a and 14a are located in the lug 12 and the handle 14 respectively, radially equidistant from the geometrical centre of the purging blind 10 and corresponding to the bolt circle diameter of the flange bolts of the ANSI Class 300# flange. The diameter of the holes 12a and 14a is equal to the diameter of the bolt holes 26 in the flange. The diameter D3 corresponds to the internal diameter of the bolt circle of the ANSI Class 150# flange.

Accordingly, when the device is installed between a pair of ANSI Class 300# flanges as shown in FIG. 1B, the two holes 12a and 14a align with two diametrically opposite holes in the pipe section flanges and are bolted to the flanges when the flanges are bolted together. Accordingly, a purging blind mounted to a pipe section junction ensures axial alignment of the purging blind with respect to the internal diameter 24 of the pipe section 20 and provides for optimal gasket sealing on the blind side of the device.

When the device is installed between a pair of ANSI Class 150# flanges, the lug 12 and handle 14 are positioned to protrude between the flange bolts of the flange bolt circle. In this configuration, the device is self-locating inside the flange bolt circle providing axial alignment between the pair of flanges. Again, gasket effectiveness is obtained with an optimal gasket seal on the blind side of the device.

Accordingly, a single purging blind may be effectively mounted between pipe sections of different classes while maintaining the important self-locating and axial alignment characteristics.

After installation of a purging blind 10 and during the purging procedure, nitrogen or dry saturated steam are generally used as the purging medium, the particular purging medium chosen depending on the process system being purged. In general, it is important that the purging medium consistently flows through the purging blind for a given pressure of purge medium. Accordingly, by increasing the width of the venting channels proportionally as the diameter of the pipe increases, enables a more constant rate of flow of purge medium throughout all diameters of blinds for any given pressure of purge medium. A constant purge medium flow allows for more thorough and effective purging to the extreme locations of isolation within the system being purged and provides for a more efficient use of the purge medium and is consequently more cost effective.

Accordingly, in a preferred embodiment of the invention, the purging blind is provided with two venting channels across the venting side of the purging blind 10. In a preferred form, the two venting channels are perpendicular to each other and are milled to a depth of ⅛" for all diameter purging blinds. With a consistent depth, the width of the venting channels may be varied with respect to the nominal pipe size diameter in accordance with the following illustrative formula:

$$\text{width}=0.125d$$

where d is the nominal pipe size, and is equal to the bore of the flange.

Accordingly, for smaller diameter pipes, the width of the venting channels for flanges on ½ NPS is ¹⁄₁₆". For larger diameter pipes, the width of the venting channels for flanges on 48 NPS is 6".

It is also preferred that the centre line of one venting channel 18 is offset from the centre line of the handle 14 and lug 12 in order to ensure that the venting channels are not aligned with the flange bolts when installed as can be seen in FIGS. 1A and 3 between either ANSI Class 150# or ANSI Class 300# pairs of flanges. The offset of venting channels provides free flow of exhausted purging medium to the atmosphere from the venting channels 18 at all times without obstruction or restriction from the flange bolts. The same will apply to the second venting channel since it is milled perpendicular to the first venting channel. A preferred offset angle is 30 degrees.

During installation and use of the purging blind, it is also preferred that a thin soft material gasket 32, such as Garlock™, be installed between the venting side of the device and the venting side flange in order to prevent metal to metal contact and possible damage to the flange face. The gasket 32 does not interfere with the venting capability of the purging blind.

The material used in the manufacture of the purging blind must generally be in compliance with current codes and practices and regulatory bodies governing the industry as is understood by those skilled in the art.

As indicated above, a purging procedure is required when vessels have to be entered for inspection, or hot work is to be performed. For this to be carried out, it is usually required that the entire system is totally de-pressured. The installation of blinds, of any kind, safeguards against migration of toxic and/or explosive vapours at minimal pressure, into the system after the purging procedure has been completed and hot work or vessel entry is in progress.

Accordingly, in the majority of installations, the purging blind 10 is used in a low-pressure environment where a single thickness blind may be used for a variety of pipe diameters. While it is not essential that a single thickness blind or series of blinds be used, a single thickness series of blinds simplifies manufacturing and reduces the overall weight of the blind. It is, therefore, preferred that the purging blind is manufactured from ½" thick material for all diameters of blinds. When the venting channels 18 are milled to a depth of ⅛", the thickness of metal remaining is ⅜" and in compliance with ANSI B 31.1-Table 1 governing the thickness of blinds for protection against loose vapours at minimal pressure.

However, in the event that there is a possibility of a pressure build up on the sealed side of the purging blind, the blind should be manufactured such that the thickness of metal remaining (T in FIG. 1B) after milling of venting channels is in compliance with ANSI B 31.1 Table 1.

Alternatively, the purging blind 10 can be manufactured at standard design thickness, and used in conjunction with a regular blind spade, the thickness of which is in compliance with ANSI B 31.1 Table 1.

It is occasionally necessary to blind large diameter piping such as 48 NPS against possible elevated pressures encountered in main transmission lines. In this situation, in order to remain in compliance with ANSI B 31.1 Table 1, the required blind metal thickness may be in excess of 3". Plant designs normally make provision for this by installing a permanent spectacle distance piece between a pair of flanges. In this situation, when blinding is required the spectacle distance piece, which is of the same thickness as the required blind, is removed and the solid blind is installed in its place. In cases such as this, a purging blind can be used in conjunction with the spectacle distance for the purposes of purging as shown in FIGS. 4a and 4b. In this situation a spectacle distance piece 50 having an internal diameter corresponding to the internal diameter of the pipe system and a thickness, T, corresponding to the required ANSI B 31.1 Table 1 specification provides the spacing required for insertion of an attached purging blind 10, the spectacle distance piece 50 and purging blind attached through a bridge 52.

As indicated above, it is practical to have a purging blind made with the venting channels milled to a depth of ⅛" on one side of the blind. In the example of a 48 NPS pipe, the width of the venting channels would be 6". As indicated previously, the thickness of metal remaining after milling must be in compliance again with ANSI B 31.1 Table 1.

It should also be noted that the purging blind in accordance with the invention is reversible to enable purging on either side of a pipe section junction as desired.

Installation and use

As indicated, the purging blind 10 in accordance with the invention is used to isolate particular sections of flanged pipeline to enable a purging gas to pumped through the system to enable hot work to be performed on the isolated section.

In installing the purging blind 10, the flange bolts 27 are loosened and a flange spreader (not shown) is used to separate the flanges an appropriate distance to permit insertion of the purging blind 10. The minimum number of flange bolts are removed to permit the insertion of the purging blind within the bolt circle and the purging blind 10 is inserted with the purging channels 18 oriented towards the venting side 30 of the junction. An optional gasket 32 may be inserted with the purging blind 10 on the venting side. Any gaskets 31 normally present within the pipe junction would be retained on the blind side of the junction. Flange bolts 27a are removed and reinserted as necessary for use with the holes 12a and 14a in the lug and handle of the purging blind. Alternatively, the handle 14 and lug 12 are oriented so as not to interfere with the flange bolts 27a. Upon the re-insertion of the flange bolts 27a, the flange bolts 27a are tightened to seal the purging blind 10 against the blind or sealed side 28 of the pipe junction. Following a similar procedure at an separate location in the system permits one or more sections to be sealed from the system thereby allowing a purging gas to be flushed through the isolated section.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

The embodiments of the invention in which an exclusive property or privilege is claimed are defined as follows:

1. A purging blind for placement between first and second adjacent pipe sections each having respective flanges and an interior and exterior, wherein the first and second adjacent pipe sections have circular cross-sections and are connected by flange bolts through flange bolt channels, the flange bolt channels defining a flange bolt circle, the purging blind comprising:

a body adapted for placement between the flanges without requiring modification to the flanges and having a diameter sized to fit within the flange bolt circle, the body having a first side for sealing engagement with the first section and a second side for engagement with the second section, the second side having at least one purging channel for allowing the passage of a purging medium between the interior and exterior of the second pipe section;

a lug on the body extending radially to the flange bolt circle, the lug having a lug bolt channel to allow the flange bolts to be inserted through the lug bolt channel and adjacent flange bolt channels.

2. A purging blind as in claim 1 wherein the body has an external diameter corresponding to the internal diameter of said bolt circle on the flange.

3. A purging blind as in claim 1 wherein the body has a diameter sized to fit coincident or radial to the flange bolt circle and the body is further provided with bolt channels between the first and second sides of the body allowing the flange bolts to be inserted through the bolt channels and adjacent flange bolt channels.

4. A purging blind as in claim 1 wherein the body further includes a handle to facilitate placement and removal of the purging blind between the first and second pipe sections.

5. A purging blind as in claim 1 wherein the at least one purging channel intersects with the centre of the body.

6. A purging blind as in claim 1 where the body has two purging channels each intersecting with the centre of the body, the purging channels offset with respect to the lug.

7. A purging blind as in claim 6 wherein the offset is 30°.

8. A purging blind as in claim 3 wherein the body further includes a handle to facilitate placement and removal of the purging blind between the first and second pipe sections.

9. A purging blind as in claim 8 wherein the at least one purging channel intersects with the lug.

10. A purging blind as in claim 9 where the body has two purging channels each intersecting with the centre of the body, the purging channels offset with respect to the flange bolt circle.

11. A purging blind as in claim 10 wherein the offset is 30°.

12. A purging blind for placement between first and second adjacent pipe sections each having respective flanges and an interior and exterior, comprising:

a circular disk body for placement between the flanges, the body having a diameter corresponding to the internal diameter of a bolt circle on the flange, a first side for sealing engagement with the first section and a second side for engagement with the second section, the second side having first and second purging channels intersecting with the centre of the body for allowing the passage of a purging medium between the interior and exterior of the second pipe section, the first purging channel perpendicular with respect to the second purging channel;

a handle on the body to facilitate placement and removal of the purging blind between adjacent pipe section;

a lug on the body diametrically opposite to the handle, the lug extending radially to the flange bolt circle, the lug and handle each having a bolt channel to allow the flange bolts to be inserted through the bolt channels, the lug and handle offset with respect to the first and second purging channels.

* * * * *